United States Patent [19]

Garrett, Jr.

[11] Patent Number: 4,987,551

[45] Date of Patent: Jan. 22, 1991

[54] APPARATUS FOR CREATING A CURSOR PATTERN BY STRIPS RELATED TO INDIVIDUAL SCAN LINES

[75] Inventor: Billy W. Garrett, Jr., Columbia, S.C.

[73] Assignee: NCR Corporation, Dayton, Ohio

[21] Appl. No.: 421,316

[22] Filed: Nov. 24, 1989

Related U.S. Application Data

[63] Continuation of Ser. No. 137,837, Dec. 24, 1987, abandoned.

[51] Int. Cl.[5] .............................................. G06F 15/62

[52] U.S. Cl. ...................................... 364/521; 340/734

[58] Field of Search ................ 364/521; 340/709, 733, 340/734

[56] References Cited

U.S. PATENT DOCUMENTS

| | | | |
|---|---|---|---|
| 4,259,725 | 3/1981 | Andrews et al. | 340/709 X |
| 4,317,956 | 3/1982 | Torok et al. | 340/709 X |
| 4,566,000 | 1/1986 | Goldman et al. | 340/709 |
| 4,625,202 | 11/1986 | Richmond et al. | 340/734 X |
| 4,668,947 | 5/1987 | Clarke, Jr. et al. | 340/709 |
| 4,706,074 | 11/1987 | Muhich et al. | 340/709 |
| 4,768,029 | 8/1988 | Burrows | 340/709 X |

FOREIGN PATENT DOCUMENTS

| | | |
|---|---|---|
| 0201267 | 11/1986 | European Pat. Off. . |
| 0229986 | 7/1987 | European Pat. Off. . |
| 0247751 | 12/1987 | European Pat. Off. . |

*Primary Examiner*—Gary V. Harkcom
*Assistant Examiner*—Mark K. Zimmerman
*Attorney, Agent, or Firm*—Wilbert Hawk, Jr.; Casimer K. Salys

[57] ABSTRACT

An architecture for generating a hardware cursor in the context of a bit mapped video display system operable from a frame buffer with non-displayed but addressable memory space. A segment of the non-displayed memory is loaded with cursor outline and pattern information. The cursor data is accessed from the non-displayed segment of the memory during horizontal blank time preceding the raster scan of the video pattern data subject to cursor overlay. Thereby, the video pattern data in the frame buffer and cursor data are arranged by scan or row line. The column location of the cursor pattern is defined by the computer and stored in a position counter to be synchronously incremented by pixel during the scan of the frame buffer line. At the appropriate count the cursor data is logically combined with frame buffer pattern data to superimpose the cursor characteristics upon the video pattern data. The cursor data buffer can thereby be relatively small yet overlay a relatively large cursor with minimal manipulation by the computer controlling the video display.

5 Claims, 3 Drawing Sheets

VIDEO PATTERN GENERATION AND POSITION

APPARATUS FOR CREATING A CURSOR PATTERN BY STRIPS RELATED TO INDIVIDUAL SCAN LINES

This is a continuation of co-pending application Ser. No. 07/137,837 filed on Dec. 24, 1987 now abandoned.

BACKGROUND OF THE INVENTION

The present invention relates generally to bit mapped raster scan video display systems. More particularly, the invention is directed to a hardware cursor generator within such system implemented to store cursor information in a non-displayed segment of the frame buffer and to insert such cursor information by strip into the related display scan lines.

Techniques for creating and manipulating patterns in a bit mapped video display are commonly known and utilized in work stations and advanced personal computer systems. The frame buffer memory arrays used to store the pixel data which is eventually converted into display patterns on the video screen conventionally include non-displayed but addressable memory segments. Prior to the advent of the dual port video DRAMS, the information in memory was serially addressed and read out in relative synchronism to the generation of the pattern on the video display. Consequently, the brief horizontal display retrace or blank time and the vertical retrace or blank time were allocated to microprocessor accessing of the frame buffer to implement pattern changes. With the various time constraints for accessing the frame buffer memory, the non-displayed but addressable segments of the frame buffer were not utilized directly for video display pattern generation. The commercial availability of dual port video DRAM devices for creating frame buffer memory arrays now allows the video display scan system to access frame buffer information by line in a single memory address cycle, thereby providing a significant time interval during which the frame buffer memory can be accessed for other purposes. The present invention, in one aspect, efficiently utilizes such additional frame buffer memory access time both to address cursor information by line and to appropriately locate such information within each line of the video display.

Cursors are shape, color or brightness differences in the representation on the video display which relate the user's activity to information within the work station or computer system. Cursors can be as small as a single pixel in a bit mapped display or, as is more common, can be comprised of multiple pixels arranged into an informative pattern such as a clock, an arrow, an index finger or a hand. Cursors are most often created by software routines which temporarily move the underlined information off the screen and replace that information with a cursor pattern. Software generated cursors degrade in performance when the cursor or screen patterns either move or are subject to windowing. Hardware implemented cursors which presently exist require additional high speed memories of significance size to store the complete two dimensional cursor pattern, and control logic or microprocessor operations to insert such patterns in synchronism with the scan of the frame buffer data.

System configurations for moving blocks of data in a bit mapped video display are developed in U.S. Pat. No. 4,533,910 and reissued Patent Re31,200. According to the first implementation, the viewports are defined and inserted into video display frames by changing the frame buffer addresses. In the case of the latter, multiple and elaborate controllers regulate the writing of data to the frame buffer, the scanning of the frame buffer data for presentation on the video display, and the exchange of data exchange between the system and the host computer. The complexity of both the systems is directed to the formation and manipulation of large windows within a graphics display.

U.S. Pat. No. 4,454,507 is directed to the superposition of vector cursors composed of lines. The cursor generation system therein requires a high speed external memory of significant size, in that the complete cursor pattern is stored in the supplemental memory. As a further distinction, the subject matter of the patent is constrained to a direct overlay of the cursor images, in contrast to logical combinations of such images with the frame buffer pattern at the cursor location.

Another patent relating to the generation of cursors in a bit mapped video display is U.S. Pat. No. 4,625,202. The teaching herein is however limited to cursors composed of lines alone, in contrast to two dimensional images even so simple as a "X" or a circle. Accordingly, this cursor generation system is very constrained in potential application.

A further teaching of cursor generation is set forth in U.S. Pat. No. 4,668,947 where predefined cursor shapes are stored externally and interjected into the displayed pattern during the scan of the frame buffer by address jumps to a supplemental high speed memory. In some respects, the concepts are analogous to those which underlie the first mentioned pair of U.S. patents. Consequently, the implementation of the patent requires not only the external high speed memory but means for tracking both the X and Y axes of the bit mapped display in order to identify the locations where cursor information is to be inserted.

In the context of such prior art, there remains a need for a video display system of nominal complexity which does not exercise the system computer to manipulate the cursor, which generates a cursor unaffected by frame buffer pattern changes such as scrolling or windowing, which can be implemented within the context of the basic frame buffer memory, and which can provide logic combinations of cursor and video pattern pixel information.

SUMMARY OF THE INVENTION

The present invention is directed to a hardware generated cursor overlay system which uses a small section of the non-displayed frame buffer memory to store the pixel pattern and a raster scan line synchronization architecture to insert the cursor pattern information into the corresponding line pattern of the video display frame.

As preferably implemented, a strip of non-displayed frame buffer memory is allocated to cursor data. The cursor pattern is written into such strip memory at the desired scan line location, with the cursor column location being designated by a counter address. Each relatively short strip of cursor data is transferred into a temporary shift register during the horizontal blanking time preceding the addressing of the associated line of the frame buffer. During the scan of the frame buffer data from a video line buffer the cursor strip data is synchronously superimposed through logic onto the pattern of the frame buffer using a line position counter.

The preferred arrangement of the present invention thereby utilizes non-displayed lines of the frame buffer to store cursor patterns of diverse shapes and directly overlays such cursor patterns onto the frame buffer stored pattern without the intervention of the computer and without changing the pattern resident in the frame buffer. The implementation also allows for logical combinations of cursor pattern with the frame buffer pattern by pixel and with multiple cursor planes. These and other advantages of the present invention will be more fully appreciated upon considering the detailed description which follows.

BRIEF DESCRIPTIONS OF THE DRAWINGS

FIG. 1 schematically illustrates a functional block diagram of a bit mapped video display system embodying the present, invention.

FIG. 2 is a schematic illustrating the frame buffer allocation both spacially and temporally.

FIG. 3 schematically illustrates the formation of a cursor pattern and a cursor outline in the context of the present embodiment.

DETAILED DESCRIPTION OF THE INVENTION

Figure 1:
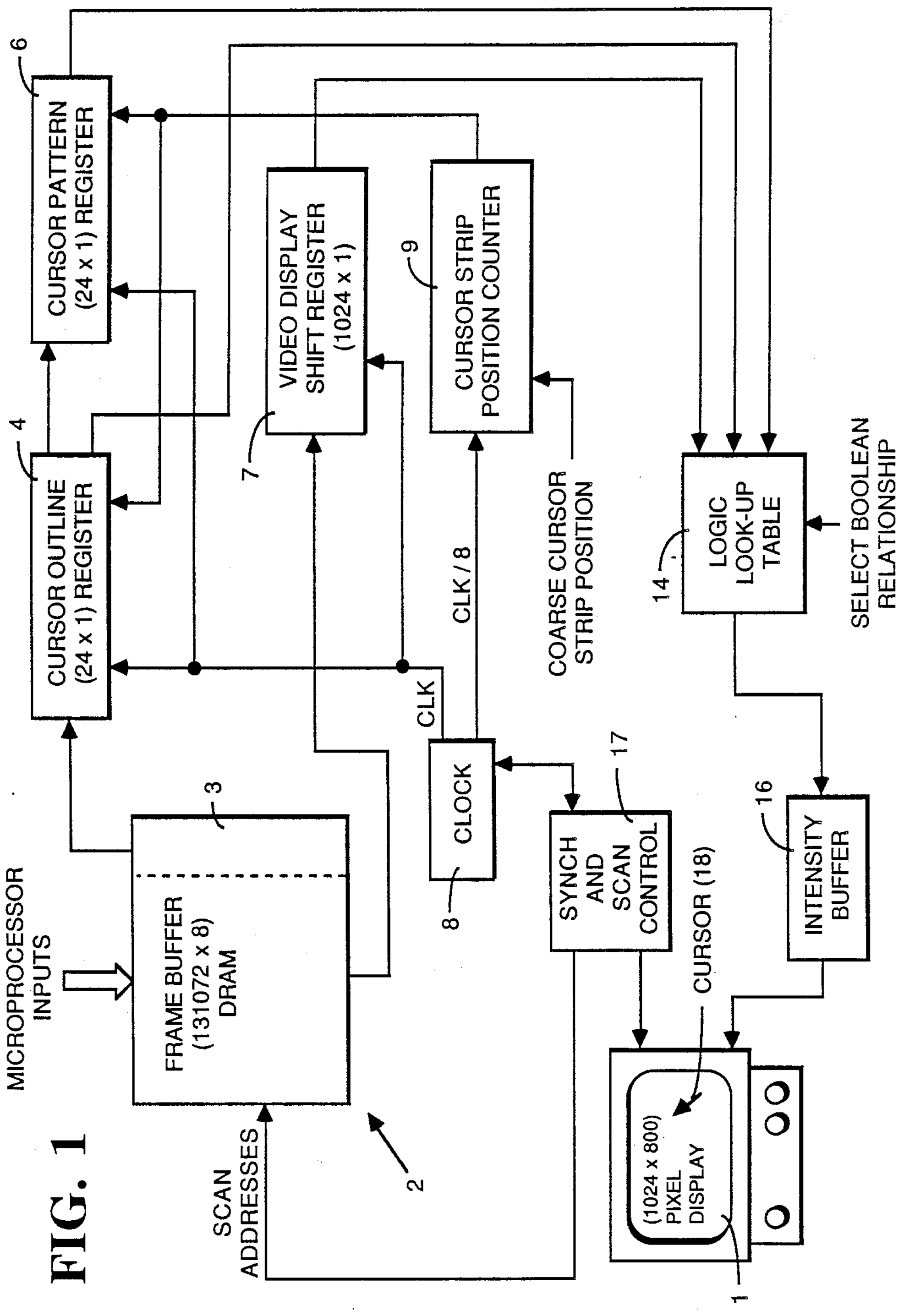

Attention is now directed to FIG. 1 of the drawings, where there is shown in block diagram form an embodiment of the present invention suitable to generate and control a cursor for a bit mapped video display of otherwise conventional form. The cursor generation architecture depicted in FIG. 1 creates a hardware type cursor overlay using a temporary buffer to store 48 cursor data bits and a column position counter to synchronize with the frame buffer raster scan. The full pattern of the cursor is stored in a non-displayed section of the frame buffer at an address coincidence with the row location within the video display. Consequently, every row line of the bit mapped display has associated therewith a corresponding 48 bit long strip of cursor information.

The cursor information is read into the 48 bit temporary buffer from the non-display section of the frame buffer by raster line during the horizontal blanking time following the raster scan of the previous line. As preferably implemented with a dual port video memory system, the data in the frame buffer for the next line to be displayed is transferred during such horizontal blank time to a video display shift register. Thereafter, during the actual scan of the buffered line, the clock synchronized transfer of video display shift register data to the video display is selectively modified by logical combinations with the cursor strip data by action of a counter operated to identify the beginning and end locations of the cursor strip within the raster line. This operation is repeated for each line of displayed frame.

The particularized functional blocks in FIG. 1 can now be referenced to the functional objectives set forth above in the context of the depicted preferred embodiment. As shown in FIG. 1, the video display 1 has a pixel capability of 1024×800. The characteristics of the pixels are defined by bits stored in the frame buffer dynamic random access memory (DRAM) array 2. Memory array 2 is a dual port video memory having an addressable size greater than the pixel count of display 1, the non-displayed portion generally represented by the section 3. Conceptually, the present invention could be applied to a bit mapped display system using a single port video memory. Such implementation would, however, be somewhat impractical given the limited blank time available for pattern changes to be introduced by the computer.

The particular architecture embodied in FIG. 1 includes a pair of 24×1 cursor registers 4 and 6, a conventional 1024×1 video display shift register 7, a master source of clock signals 8, a cursor strip positioned counter 9; a logic lookup table 14, and conventional buffer and synchronization and scan control devices generally depicted as blocks 16 and 17.

Figure 2:
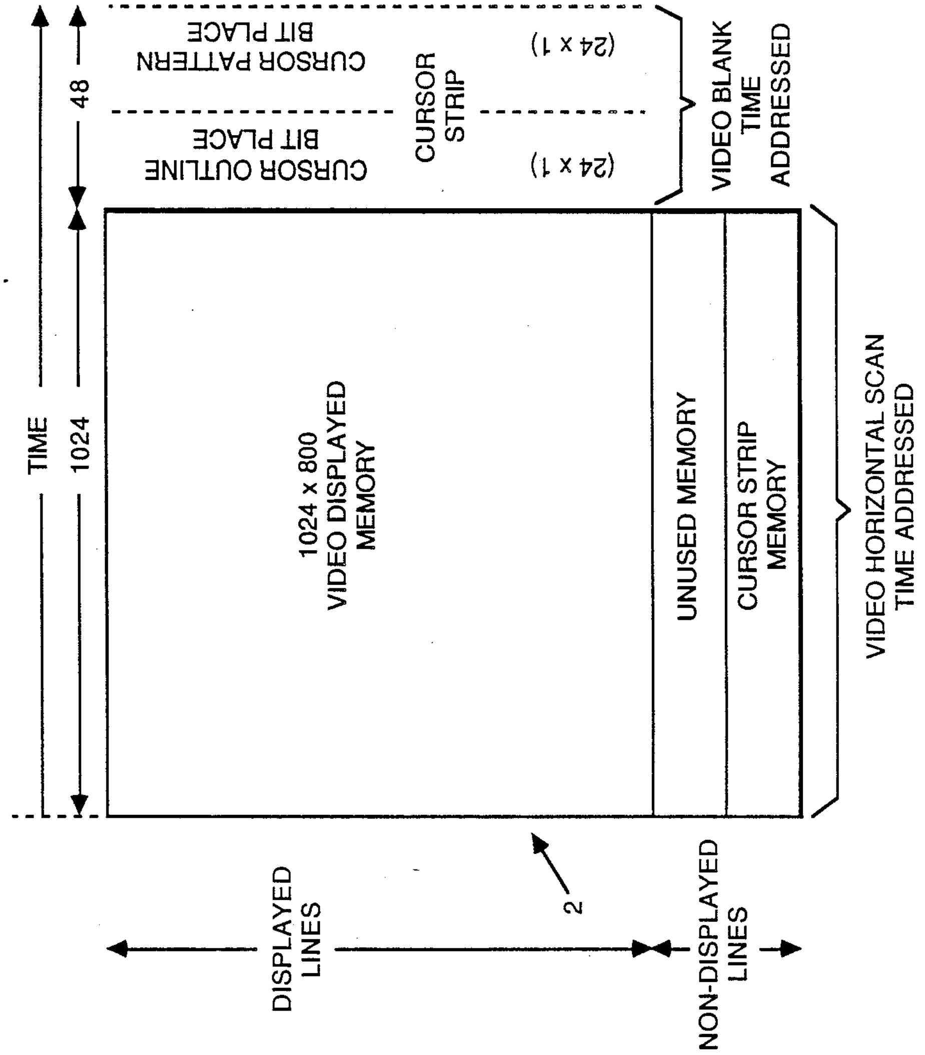

FIG. 2 schematically illustrates the spatial and temporal allocation of the frame buffer for the present embodiment. Frame buffer 2 is comprised of a bit mapped video display memory segment which stores the actual frame pattern for the video display, as well an addressable but non-displayed cursor strip memory segment. Addressing of the cursor strip memory segment is related by line to the video displayed memory segment. The availability of such non-displayed segment of the frame buffer arises, as commonly known, from the arrangement memory in binary increments numerically different than the pixel count of the video display.

The generation of a cursor, such as pointer 18 on video display 1, begins with the generation of a cursor block outline and the further definition of an internal pattern of the cursor by the computer. The pattern so defined is loaded into cursor strip memory segment 3 during the conventional frame buffer writing operation. The line address of the cursor is matched to the line location within the video display at which the cursor is to appear. The column location of the cursor is defined by a coarse cursor strip positioned reference number which is operable to start at 8 pixel position increments. As so defined, there exist data representing a cursor in non-displayed frame buffer which is aligned by row or line to its intended location in the video display frame and aligned at 8 pixel increments by column address entered into cursor strip position counter 9.

At the conclusion of each raster line scan, during the horizontal blank time, 48 bit long strips of cursor data for the next succeeding line of the video display are shifted from frame buffer memory segment 3 to registers 4 and 6. At the beginning of the next raster scan cycle, the corresponding line of video data in the frame buffer is transferred in conventional manner by row into video display shift register 7. Consequently, at that time, the data representing the video pattern for the next succeeding raster line is resident in video display shift register 7, the cursor data for the same line is resident in registers 4 and 6, and data representing the cursor strip column location resides in position counter 9. Upon the commencement of the next scan and synchronous therewith, clock 8 shifts from register 7 the video data by pixel to logic lookup table 14. For those pixel positions where no cursor data is to be superimposed, cursor pattern register 4 and 6 are disabled by cursor strip position counter 9. Counter 9 is incremented at 8 pixel steps synchronous to clock 8. The clock synchronized raster scan continues across video display 1 using the data in shift register 7 until cursor strip position counter 9 identifies the starting location for the cursor data block. Thereafter, for an interval of 24 pixel positions, logic lookup table 14 receives not only the originally defined video display shift register data but cursor outline data from register 4 and cursor pattern data from register 6. The cumulative logic effects, as defined by the desired boolean relationship established in block 14, are actually transmitted to video display 1 through buffer 16. After such 24 clock cycles, cursor registers 4 and 6 are effectively disabled to return the pattern of display 1 to that stored in video display shift register 7 alone. The cycle is repeated with the conclusion of the raster line, and the onset of the horizontal blanking time, with the transfer of 48 bits of data representing the next line of cursor.

Figure 3:
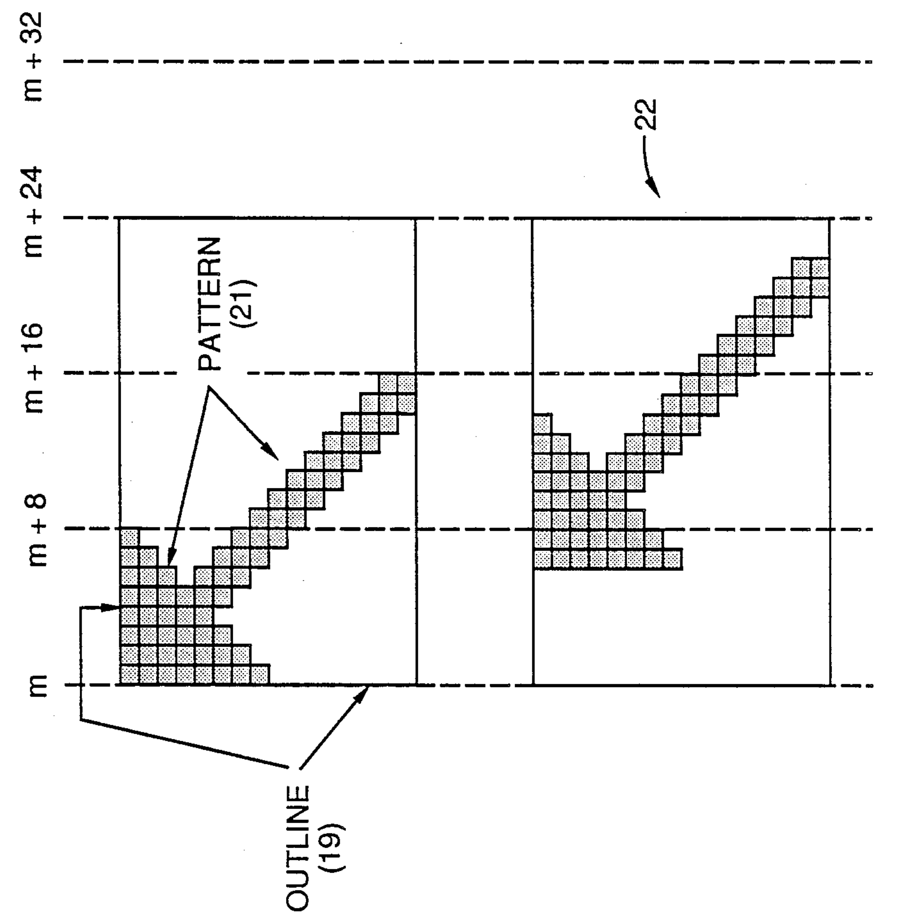

FIG. 3 illustrates the generation of the an exemplary cursor, including a cursor outline 19 and a cursor pattern 21. The rows of the outline and pattern pixels match the video display, while the column location is defined by the computer identified during the raster scan by the position counter at intervals of 8 pixels. For instance, in the context of FIG. 3, the cursor outline and resident internal pattern can start at any column which is a multiple of 8 pixel positions and will conclude 24 pixel positions later. As shown, the outline begins at a pixel position m and concludes with a position m+24. Positioning of the cursor pattern 21 within cursor outline 19 at single pixel increments is performed by the computer during the generation of the pixel pattern. For example, as shown at 22, the pattern may be shifted within the outline during the generation of the pattern with reference to the outline. Thereby, the actual pattern of the cursor may be positioned within the full one pixel precision of the video display for so long as the line length of the pixel pattern is 8 pixel positions shorter than the length of the pixel outline. In the context of FIG. 3, full column position precision can be retained for a pattern composed of 16 or fewer pixel columns.

Increasing the sizes of registers 4 and 6 in FIG. 1 concurrently increases the new length of the cursor patterns which can be generated. On the other hand, such extensions of cursor dimensions do consume additional area in non-displayed frame buffer segment 3. For the present arrangement the cursor data is allocated a memory space of 48×800. Such a segment is well within the reserved of the 131072×8 frame buffer 2, in that the memory associated directly with the pixel count of the video display 1 leaves approximately 230,000 bits of addressable memory unused. Note that the defined 48×800 strip of non-displayed frame buffer allocated to pixel data consumes approximately 40,000 bits of such residual memory.

The use of logic lookup table 14 in FIG. 1 to introduce a boolean relationship into the pattern actually transmitted to video display 1, based on a combination of the originally defined video display pattern, the cursor outline, and the cursor pattern, provides the user with the ability to overlay the cursor in a visible form irrespective of the background. For instance, a black cursor pattern placed on a black background would not be visible, while a black cursor pattern framed within a white cursor outline and placed against a black background would be perceivable. An XOR implementation of a cursor outline is an example of an popular approach to retaining a cursor pattern irrespective of the background.

Note as another aspect of the present invention that the cursor strip of 24 pixels line length is fully capable of extending in the column direction from the top of the video display to the very bottom of the video display. Consequently, the cursor can be configured and logically combined in a pattern of up to 24×800 pixels dimension. This provides the use with a great degree of flexibility when compared to the commonly utilized 16×16 size cursor blocks, especially given the need for 512 bits of additional high speed video memory to implement even such small cursor patterns.

In the composite, note that the present invention provides an architecture by which non-displayed frame buffer can be utilized to store a relatively elaborate cursor pattern extending the full height of the screen while using a relatively short bit length buffer, is implemented to logically combined cursor data with frame buffer pattern data, overlays complex frame buffer patterns notwithstanding the presence of windows or scrolling, and provides these features without unduly burdening the computer with elaborate software manipulations or transfers of frame data to temporary store.

It will be understood by those skilled in the art that the embodiment set forth hereinbefore is merely exemplary of the various elements and procedures which are essential to the present invention, and as such may be replaced by equivalents without departing from the invention thereof, which now will be defined by the appended claims.

I claim:

1. A cursor generator for a pixel bit mapped video display system, comprising:

a frame buffer memory for storing a bit mapped display a pattern with a plurality of display lines and having non-displayed addressable space with lines corresponding to each of aid display lines;

means for storing data representing a pattern of a cursor strip in said non-displayed space of the frame buffer memory;

means for reading data representing a line of the display pattern stored in the frame buffer memory;

means for reading data representing the pattern of the cursor strip for a line corresponding to a respective line of the display pattern, said cursor strip having a starting location within said line;

means for identifying said starting location; and means for logically combining by pixel position the display pattern data and cursor strip data when said starting location has been identified.

2. The apparatus recited in claim 1, wherein the means for reading the data representing the pattern of the cursor strip includes a first register for storing a string of data bits representing the cursor pattern for a portion of a line of the video display.

3. The apparatus recited in claim 2, wherein the means for reading the data representing a line of the display pattern stored in the frame buffer includes a shift register connected between the frame buffer memory and the means for logically combining.

4. The apparatus recited in claim 3, wherein the frame buffer memory is as dual port random access memory array, and the means for reading the data representing the pattern of the cursor strip transfers such data into the first register during a horizontal blank time of the video display.

5. The apparatus recited in claim 4, wherein the cursor strip position counter selectively enables in synchronism to a raster based clock the data from the first register and the first shift register.

* * * * *

UNITED STATES PATENT AND TRADEMARK OFFICE

CERTIFICATE OF CORRECTION

PATENT NO. : 4,987,551

DATED : January 22, 1991

INVENTOR(S) : Billy W. Garrett, Jr.

It is certified that error appears in the above-identified patent and that said Letters Patent is hereby corrected as shown below:

Column 6, line 28, delete the word "a" between the words play and pattern.

Column 6, line 30, correct the spelling of the word said by adding an --s-- to the word aid.

Signed and Sealed this

Twenty-sixth Day of May, 1992

*Attest:*

DOUGLAS B. COMER

*Attesting Officer*

*Acting Commissioner of Patents and Trademarks*